No. 753,718. PATENTED MAR. 1, 1904.
F. H. LIPPINCOTT.
SODA WATER APPARATUS.
APPLICATION FILED FEB. 25, 1903.
NO MODEL. 3 SHEETS—SHEET 2.

WITNESSES: INVENTOR:
Walter C. Pusey Fisher H. Lippincott,
BY
Joshua Pusey
ATTORNEY.

No. 753,718. PATENTED MAR. 1, 1904.
F. H. LIPPINCOTT.
SODA WATER APPARATUS.
APPLICATION FILED FEB. 25, 1903.
NO MODEL. 3 SHEETS—SHEET 3.
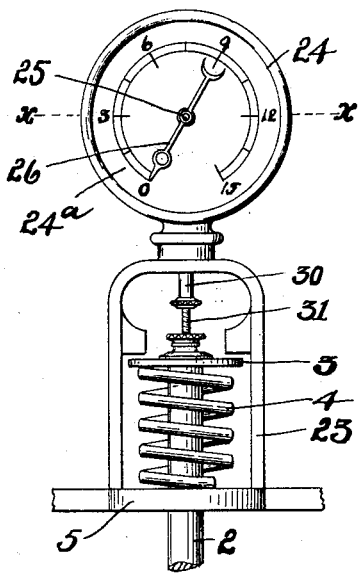
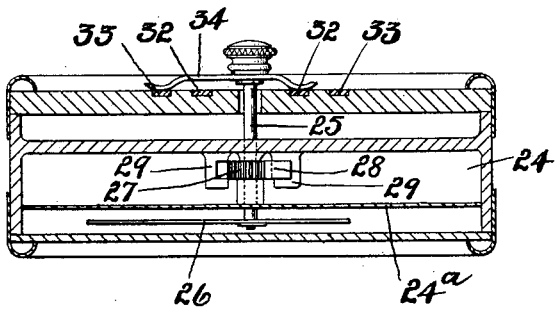
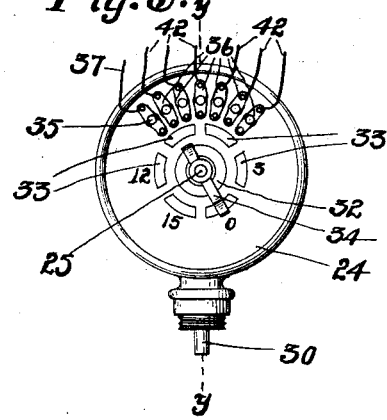
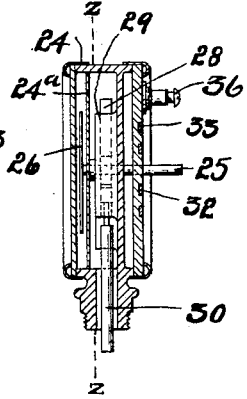
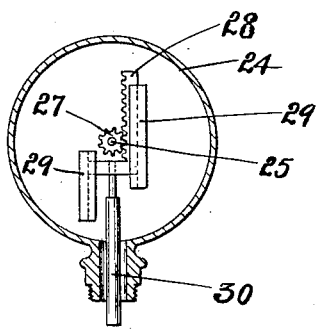
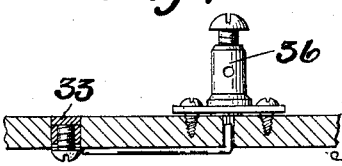
WITNESSES: INVENTOR: Fisher H. Lippincott.
BY Joshua Pusey.
ATTORNEY No. 753,718. Patented March 1, 1904.

UNITED STATES PATENT OFFICE.

FISHER H. LIPPINCOTT, OF PHILADELPHIA, PENNSYLVANIA, ASSIGNOR TO AMERICAN SODA-FOUNTAIN COMPANY, OF JERSEY CITY, NEW JERSEY, A CORPORATION OF NEW JERSEY.

SODA-WATER APPARATUS.

SPECIFICATION forming part of Letters Patent No. 753,718, dated March 1, 1904.

Application filed February 25, 1903. Serial No. 145,023. (No model.)

*To all whom it may concern:*

Be it known that I, FISHER H. LIPPINCOTT, a citizen of the United States, residing at the city and county of Philadelphia, State of Pennsylvania, have invented certain new and useful Improvements in Soda-Water Apparatus, of which the following is a full, clear, and exact description, reference being had to the accompanying drawings, of which—

Figure 1:
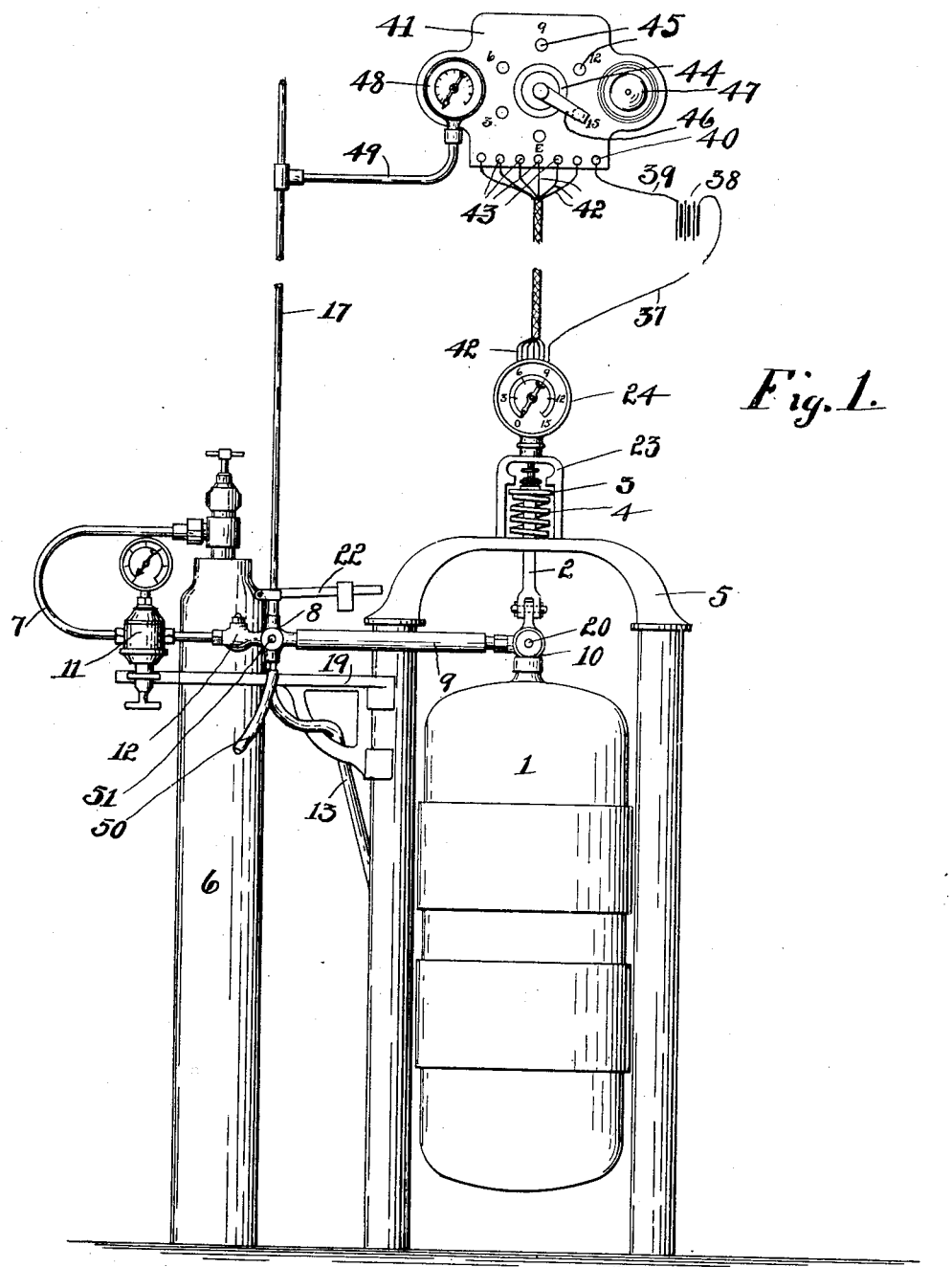
Figure 2:
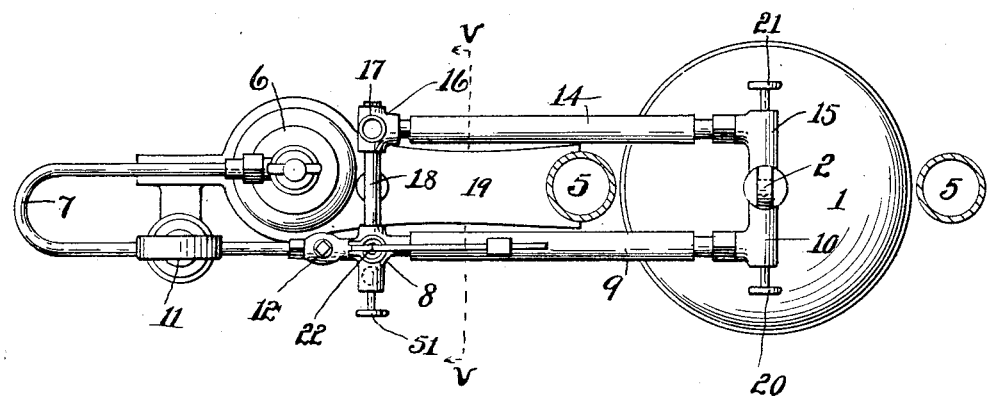
Figure 3:
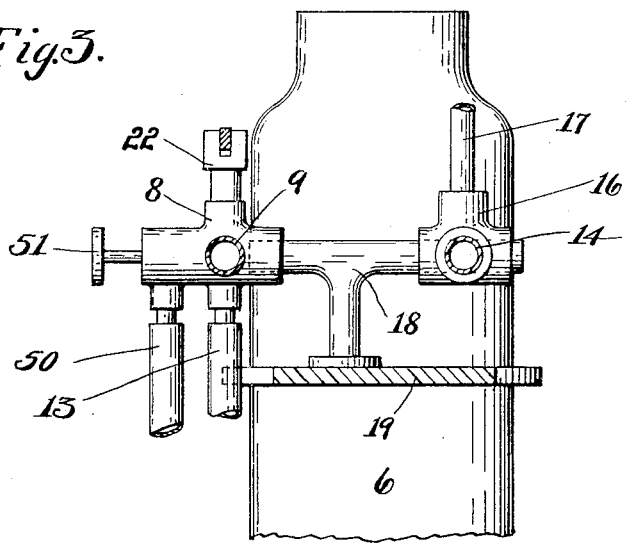

Figure 1 is a side elevation. Fig. 2 is a plan view, enlarged, parts being omitted. Fig. 3 is an enlarged section on line $v\,v$, Fig. 2. Fig. 4 is an elevation, enlarged, of the indicator and the upper part of the spring-supported rod, to which the soda-water tank is connected. Fig. 5 is a section, enlarged, on line $x\,x$, Fig. 4. Fig. 6 is a rear side elevation of the indicator. Fig. 7 is a section on line $y\,y$, Fig. 6. Fig. 8 is a full section on line $z\,z$, Fig. 7. Fig. 9 is a section, enlarged, through the back plate of the indicator, showing some of the electrical connections.

This invention has for its object to provide improved means for indicating when the tank of a soda-water fountain is being charged with soda-water the quantity or number of gallons of the water within the tank at any time.

A leading feature of the invention comprises a soda-water tank that is supported by a suitable spring, whereby its position vertically is determined by the weight of the quantity of water therein, there being a flexible pipe connection between the tank and the source of supply of the soda-water and between the tank and the pipe leading therefrom to the soda-fountain, whereby the tank is free to change its position while it is being charged with the soda-water and while the latter is being drawn at the soda-fountain, and an annunciator with electrical connections between the same and the tank, whereby through the movement of the latter, corresponding to the quantity of water therein, said annunciator is caused to sound an alarm when a predetermined quantity of water has entered the tank or when a certain quantity of water has been withdrawn therefrom.

Another feature of the invention comprises, in combination with said spring-supported tank, an annunciator, an indicator adapted to be actuated by or through the movements of the tank, and electrical connections between the latter and said annunciator, whereby certain advantageous results are secured, as hereinafter described.

Other features of the invention relate to details of construction hereinafter described and duly pointed out.

Referring to the accompanying drawings, 1 is a soda-water tank of the usual form and is suspended by a rod 2, having a collar 3, that rests upon the top of a coiled spring 4, which is supported by an inverted-U-shaped frame 5, through an opening in the crown of which said rod passes.

6 is a vessel for containing the carbonic-acid gas under pressure and communicating, by a pipe-section 7, a T 8, a yielding or flexible connection or pipe-section 9, and an angular connection 10, with the interior of the tank 1.

11 is a pressure-regulator of well-known construction in the pipe-section 7, and 12 is a check-valve in the latter. Also connected to the T 8 is a pipe 13 from a source of water-supply under pressure. Thus the gas and water enter the tank together.

A yielding flexible pipe 14 connects an angular connection 15, that leads into and adjacent to the bottom of the tank and an angular connection 16, from which extends a pipe 17, that leads to the soda-fountain (not shown) on an upper floor of the building.

The T 8 and the connection 16 are sustained by a T-shaped support 18, whose base rests upon a bracket 19 of the frame 5.

20 is a valve in the connection 10 for opening and closing the inlet into the tank, and 21 is a similar valve in the connection 15 for opening and closing the exit from the tank.

22 is a weighted safety-valve in the T 8 for insuring against excess of pressure of gas and water, especially within the flexible pipe-section 9.

Supported by a frame 23, that rises from the crown of frame 5, is an indicator, consisting in the present instance of a cylindrical box 24, in which is journaled an arbor 25, that carries a pointer 26. This arbor has a pinion 27, Figs. 5, 7, and 8, whose teeth engage those of a vertical rack 28, that is adapted to slide in suitable guideways 29, which are secured to the box 24. This rack is connected to the upper end of the rod 2, or rather in the present instance (for purpose of adjustment) to a rod-section 30, that is connected to the rod 2 by a screw-threaded rod 31.

The face of the dial 24ª of the box 24, over which the pointer 26 extends, is marked with "0" and the numerals "3," "6," "9," "12," and "15," Fig. 4, indicating gallons. On the opposite side of the box is a conductor-annulus 32 and a series of segments 33, surrounding the same and insulated therefrom, corresponding to the "0" and the numbers "3," "6," "9," "12," and "15" on the indicator-dial.

34 is an arm that is carried by the arbor 25 of the pointer and contacts with the annulus 32 and is adapted to contact with the segments 33 as the arbor rotates.

A conductor-wire (not shown) connects the annulus 32 with a binding-post 35, and a series of similar wires (also not shown) connect the several segments 33 and binding-posts 36, respectively. A wire 37 runs from post 35 to a battery 38 or other source of electric energy, from which latter run a wire 39 to a binding-post 40 of an annunciator 41, that is located at or near the soda-water fountain. Other conductor-wires 42 runs from the posts 36, respectively, to posts 43 of the annunciator. The latter has an annulus 44, and surrounding the same is a series of terminal disks 45, corresponding to the segments 33 of the indicator-box. A wire (not shown) from post 40 runs to the annulus 44, and other wires (not shown) run from the posts 43 to the disks 45, respectively. A rotatable arm 46, contacting with said annulus, is adapted to be brought into contact with any one of the disks 45.

47 is an alarm-bell in circuit with the battery 38 and the said disks.

If the annunciator-arm 46 is rotated to contact with any one of these disks, the alarm-bell will be sounded, when the arm 34 is caused by the movement of the tank and consequent rotation of the pointer-arbor 25 to contact with the one of the segments 33 that corresponds with—that is, electrically connected with—said particular disk. For example, if the arm 46 be set, as in Fig. 1, to contact with the disk near which is the number "15" (indicating gallons) the bell 47 will be caused to ring when the arm 34 reaches the corresponding one of the segments 33—that is, when the pointer rotates to "15" on the disk. Thus the attendant at the soda-fountain may be notified by setting the arm 46 in contact with any one of the disks the number of gallons of water that have entered the tank while the latter is being charged, or after the same has been so charged he may set said arm 46 in contact with one of the disks, and when the quantity of water has diminished to the number of gallons corresponding to the particular disk the bell would sound, giving warning that the tank requires or will shortly require to be recharged with water.

I usually attach to the annunciator-board a pressure-indicator 48, that communicates by a pipe connection 49 with the pipe 17, leading from the tank 1 to the soda-fountain. I also sometimes connect to the hereinbefore-mentioned T 8 a pipe 50 for connecting to another tank which it may be desired to charge with the soda-water, the exit to said pipe from the T 8 being adapted to be opened and closed by a valve 51.

Other known devices intervening between the tank and the annunciator for causing the alarm of the latter to be sounded through the movement of the tank at a predetermined time to which the annunciator is set may be employed in lieu of the rotatable arbor, the annulus, and segments. Also other forms of annunciators may be used in lieu of the particular one herein illustrated and described, it only being essential that there be means whereby the annunciator-alarm may be placed in circuit with any one of the contact surfaces or segments.

Having thus described my invention, I claim as new and desire to secure by Letters Patent—

1. In an apparatus of the character recited, the combination of the spring-supported tank, the respective yielding pipe connections between the same and sources of water and gas supply, and the soda-fountain, the annunciator, and electrical connections between the latter and said tank, whereby the annunciator-alarm may be caused to be sounded at a predetermined time, by the movements of the tank, substantially as described.

2. In an apparatus of the character recited, the combination of the spring-supported tank, the respective yielding pipe connections between the same and the sources of gas and water supply, and the soda-fountain, the rotatable arbor, connections between said tank and arbor, whereby the latter is adapted to be actuated by the vertical movements of the tank, the arm carried by said arbor, the annulus with which said arm contacts, the segments with which said arm is adapted to be brought into contact, the annunciator, and electrical connections between the same and said annulus and segments whereby the annunciator-alarm may be caused to sound at a predetermined time in the rotation of said arm, substantially as described.

3. In an apparatus of the character recited, the combination of the spring-supported tank, the respective yielding pipe connections between the same and the sources of gas and water supply, and the soda-fountain, the rotatable arbor, mechanism connecting said tank and arbor whereby the latter is adapted to be actuated by the vertical movements of said tank, the arm carried by said arbor, the annulus with which said arm contacts, the series of segments with which said arm is adapted to be brought into contact, the annunciator consisting of the rotatable arm, the annulus with which said arm contacts, the series of disks, corresponding to the said segments, with which said last-mentioned arm is adapted to be brought into contact, and electrical connections between said two annuli and a source of electrical energy, and conductor-wires between said respective segments and said disks, together with the alarm-bell, and conductors connecting the same and said disks, substantially as described.

4. In an apparatus of the character recited, the combination of the frame, the spring supported by said frame, the tank suspended from said spring, the indicator, consisting of the arbor, the pointer carried thereby, and the dial, connections between said tank and the indicator-arbor, whereby the latter is adapted to be actuated by and in correspondence with the vertical movement of the tank, the annunciator and electrical connections between the same and the indicator whereby the annunciator-alarm is caused to be sounded at a predetermined position rotatively of the indicator-arbor, substantially as and for the purpose set forth.

In testimony whereof I have hereunto affixed my signature this 5th day of January, A. D. 1903.

FISHER H. LIPPINCOTT.

Witnesses:
JOHN M. CAMPBELL,
WALTER C. PUSEY.